United States Patent [19]

Ikari et al.

[11] Patent Number: 4,864,147

[45] Date of Patent: Sep. 5, 1989

[54] OPTICALLY SCANNING DISPLACEMENT SENSOR WITH LINEARITY CORRECTION MEANS

[75] Inventors: Motoo Ikari; Yuji Yakada; Shintaro Yamamoto; Toshimitsu Isoi; Kaoru Shirakura; Tadashi Satake; Yoshiaki Kanbe, all of Osaka; Yasuo Ishiguro, Toyota; Nobuyuki Suzuki, Toyota; Yoshito Kato, Toyota; Masao Kawase, Toyota, all of Japan

[73] Assignees: Matsushita Electric Works, Ltd.; Toyota Jidosha Kabushiki Kaisha, both of Japan

[21] Appl. No.: 212,228

[22] Filed: Jun. 27, 1988

[30] Foreign Application Priority Data

| Jun. 30, 1987 | [JP] | Japan | 62-163427 |
| Sep. 16, 1987 | [JP] | Japan | 62-231511 |
| Mar. 28, 1988 | [JP] | Japan | 63-73541 |
| Mar. 28, 1988 | [JP] | Japan | 63-73542 |
| Apr. 30, 1988 | [JP] | Japan | 63-108027 |
| Apr. 30, 1988 | [JP] | Japan | 63-58883[U] |

[51] Int. Cl.⁴ .......................................... G01N 21/86
[52] U.S. Cl. ....................................... 250/560; 356/1
[58] Field of Search .................. 250/560, 561, 201 AF; 356/1, 4, 376; 354/403

[56] References Cited

U.S. PATENT DOCUMENTS

| 3,612,890 | 10/1971 | Cornyn et al. | 250/222.1 |
| 4,601,574 | 7/1986 | Yamane et al. | 356/1 |
| 4,633,077 | 12/1986 | Ikari et al. | 250/221 |
| 4,647,209 | 3/1987 | Neukomm et al. | 356/376 |

FOREIGN PATENT DOCUMENTS

| 0183240 | 6/1986 | European Pat. Off. | |
| 0137517 | 4/1985 | Fed. Rep. of Germany | |
| 0127804 | 8/1982 | Japan | 356/376 |
| 0117102 | 6/1985 | Japan | 356/376 |
| 2131644 | 6/1984 | United Kingdom | |

Primary Examiner—David C. Nelms
Assistant Examiner—Eric F. Chatmon
Attorney, Agent, or Firm—Leydig, Voit & Mayer

[57] ABSTRACT

An optically scanning displacement sensor is arranged to compute by means of a triangulation an inverse function from a first measured distance signal proportional to output position signals from a position detecting means which receiving reflected light from an object to be detected, and the first measured distance signal is multiplied at a linearity correcting means by a signal of a sum of the inverse function and a constant so as to compute a second measured distance signal, whereby a two-dimensional position detection can be realized with the least required memory capacity and the minimum adjusting process.

8 Claims, 12 Drawing Sheets

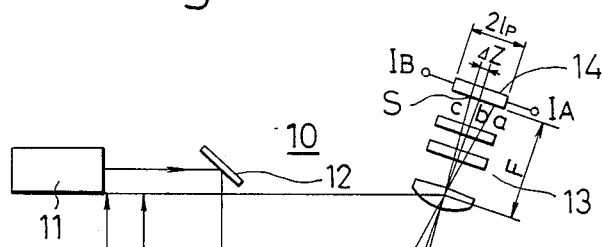
Fig. 1
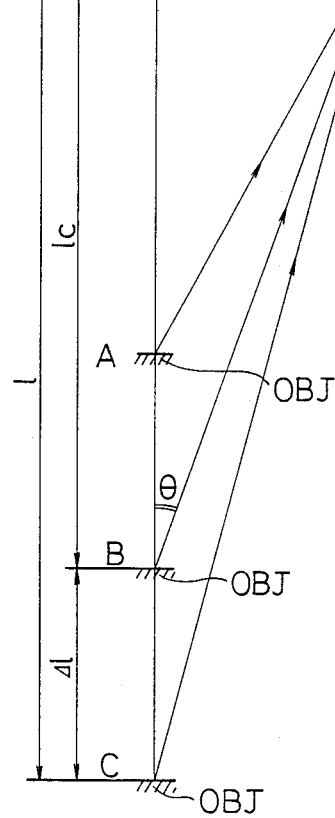
Fig. 4
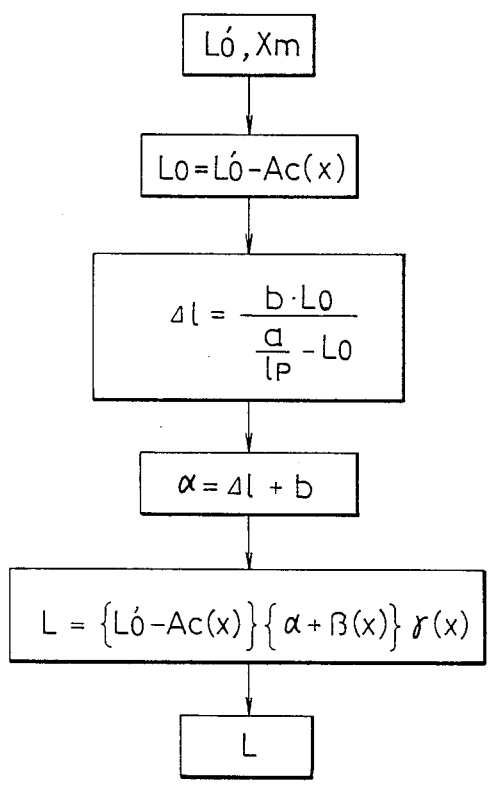

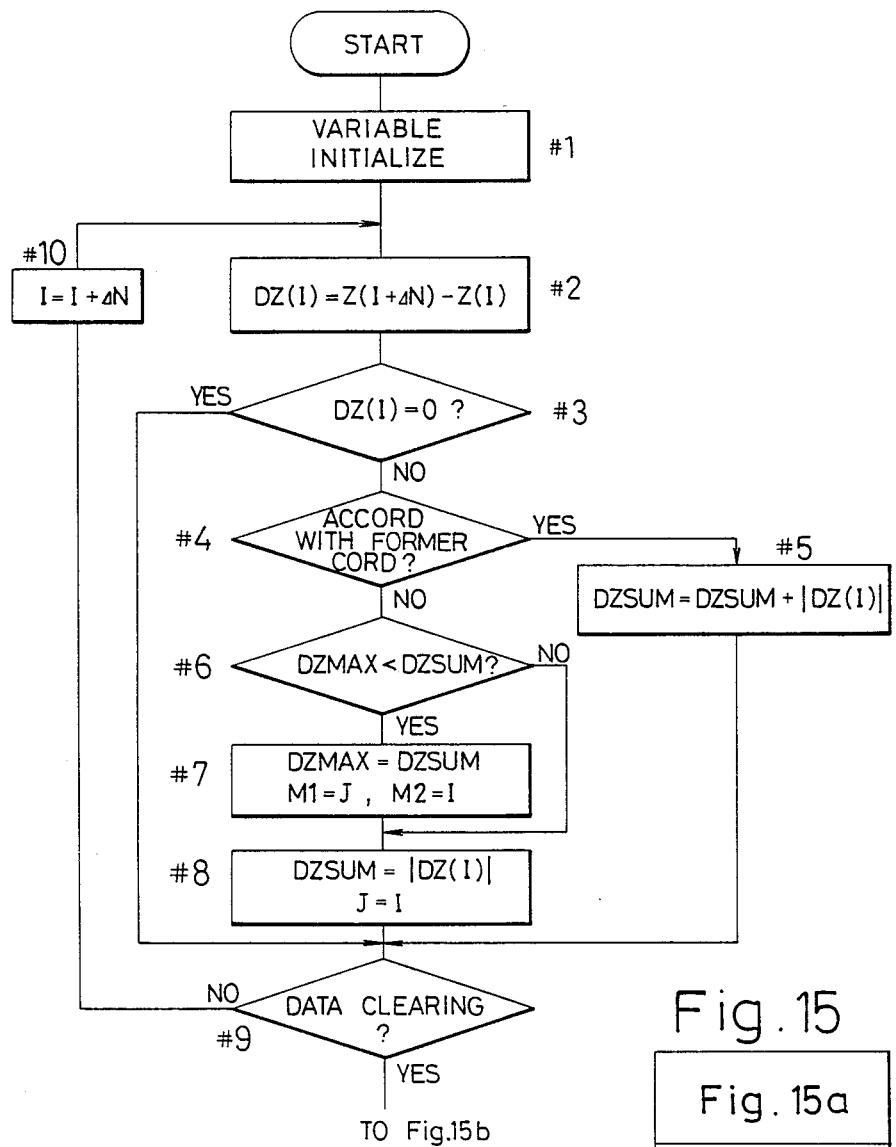

OPTICALLY SCANNING DISPLACEMENT SENSOR WITH LINEARITY CORRECTION MEANS

TECHNICAL BACKGROUND OF THE INVENTION

This invention relates to optically scanning displacement sensors utilizing a triangulation and, more particularly, to a displacement sensor which optically scans in triangulation system a surface of an object to be detected for sensing two-dimensionally surface profile of the object.

The optically scanning displacement sensor of the kind referred to can detect at a high precision the surface profile of the object, and may effectively be utilized in automobile production lines and the like in which such automatic machining as robotic arc welding is carried out.

DISCLOSURE OF THE PRIOR ART

Generally, there have been proposed various types of the sensors for carrying out optical measurement of the object by means of the triangulation, and U.S. Pat. No. 3,612,890 to William S. Cornyn, Jr. et al discloses an effective arrangement to the detection of displacing distance of the object. In this U.S. patent, a light beam is projected from a source onto the object, reflected light from the object is made incident through a condensing lens onto a photosensor of a light receiving means, and an operational means provides displaced position signals according to any displacement in the position of the reflection on the photosensor. The triangulation arrangement of this U.S. patent enables it possible to highly precisely measure the displaced position of the object and has been sufficiently satisfactory as a basic measuring technique.

In such known detecting arrangement as in the above, a variation in relative position of the object with respect to the photosensor or, in other words, a variation in the distance between the object and the photosensor due to a displacement of the object or due to a scanning with the light beam of an undulated surface profile of the object will have a following relationship to a displacement distance $\Delta l$ of the object. Assuming that a distance $l$ from the light beam source to the object is $l_c + \Delta l$ (where $l_c$ is a distance between the light source and the object when the reflected light passed through the condensing lens is focused on the center of the photosensor, and $\Delta l$ is a distance by which the object is displaced), F is a distance between the lens and the photosensor, $\Delta z$ is a displaced distance by which the reflected light through the lens is displaced from the center of the photosensor due to the displacement of the object, and $\theta$ is an intersecting angle between optical axes of the source light and of the lens and photosensor:

$$(l_c/\cos\theta + \Delta l\cos\theta)\Delta z = (\Delta l\sin\theta)F$$

$$\Delta z = (\tan\theta)F\Delta l/(l_c/\cos^2\theta + \Delta l)$$

If $a = (\tan\theta)F$ and $b = l_c/\cos^2\theta$, then $$\Delta z = a\Delta l/(b + \Delta l) \quad (1)$$

Here, it will be understood that the displaced distance $\Delta z$ has a nonlinear relationship to the displacement distance $\Delta l$.

While the operational means allows to obtain an incident position signal of the reflected light on the photosensor, the displaced distance $\Delta z$ will have such a relationship to the incident position signal as expressed by an equation (2) as follows, wherein $I_A$ is an incident position signal upon a displacement of the incident reflected light in one direction from the center of the photosensor, $I_B$ is another incident position signal of a displacement in another direction, and $2l_P$ is an effective length of the photosensor:

$$(I_A - I_B)/(I_A + I_B) = \Delta z/l_P \quad (2)$$

As will be clear from the above equations (1) and (2), the measured distance signal Lo from the operational means and containing information on the displacement distance $\Delta l$ of the object has no linearity with respect to the displaced distance $\Delta l$. Accordingly, it has been demanded for this type of the system which can be mostly used under such a condition that the distance between the light source and the measuring object always varies either to a large or small extent, that the system maintains a high measuring precision in the displacement distance $\Delta l$ with a high linearity to the measured displacement distance signal.

In view of this respect, there has been suggested an improved arrangement that can realize the highly precise measurement of the variable distance between the light source and the object and can provide a measured distance signal having a sufficient linearity to any change in the distance. In this improved arrangement, an attempt has been made in that a correction signal is properly provided to the measured distance signal Lo of the operational means, from a digital operational circuit including a memory means for storing a preliminarily obtained corrective value to correct an anticipated nonlinearity of the signal Lo and a CPU for performing such corrective operation. However, this arrangement has had such problems that, to realize a high resolution and a high distance measuring precision, the memory means is required to have a considerably large storage capacity, and the corrective value must be set optimumly in view of manufacturing tolerance of constituent parts of the system, which requirements rendering the system to become expensive, complicated in adjusting works, and unsuitable for the mass production.

In order to eliminate these problems, further, Motoo Ikari et al included in the present inventors have proposed an optical displacement measuring system utilizing a triangulation as disclosed in U.S. patent application No. 929,417 (or German Patent Application No. P 36 40 159.5), in which in particular an operational means is provided to perform addition and subtraction on each of a pair of positional output signals to obtain a ratio between the both output signals for generating a measured-distance signal with respect to the object, and a mathematical correction number is applied by a linearity correcting means to one of the pair of the positional output signals to correct any nonlinearity of the measured-distance signal. With this system, no memory means of a relatively large capacity i required, and the measured-distance signal Lo can be provided with the linearity at a high precision with a simpler and inexpensive arrangement. However, while this system shows a satisfactory result in achieving a single dimensional positional detection by means of such a single dimensional position detecting element as, preferably, a PSD utilized and with a distance between a position detecting element and the object employed as a function, there still has not been provided any two-dimensional positional detection means employing not only the function of the distance between the position detecting element and the object but also a scanning length as an additional function, the scanning length being of a light beam in a direction intersecting at right angles a direction of the single dimensional positional detection, and it has been a demand that, in an event of detecting, for example, surface profile of the object, the two-dimensional positional detection can be realized while the measured-distance signal is provided with a sufficient linearity.

Technical Field of the Invention

A primary object of the present invention is, therefore, to provide an optically scanning displacement sensor which realizes the two-dimensional positional detection, and still capable of rendering the required memory capacity for correction number data in carrying out the linearity correction with respect to the measured-distance signal to be the minimum, and allowing an adjustment to be performed.

According to the present invention, this object can be realized by means of a displacement sensor utilizing a triangulation in which a light beam is projected from a light projecting means onto an object to be detected as deflected by a deflecting means, reflected light from the object is passed through a condensing, receiving optical means and caused to be irradiated upon a position detecting means which generates a pair of output signals of mutually opposite values, an operational means performs addition and subtraction on each of the pair of the positional output signals to obtain a measured-distance signal denoting a distance of the object, and a linearity correcting means corrects nonlinearity of the measured-distance signal, wherein the linearity correcting means calculates an inverse function out of a first measured-distance signal proportional to the output signal of the position detecting means, as well as a second measured-distance signal proportional to variation in the distance of the object by multiplying the first measured-distance signal by a signal which is the sum of the inverse function and a constant.

With the optical scanning displacement sensor according to the present invention of such arrangement as above, it is made possible to realize a two-dimensional position detecting arrangement providing to the measured-distance signal the linearity without requiring a memory means apt to be of a relatively large capacity nor such complicated parts as CPU and the like which are linked to the memory means, and to adapt the sensor to a high speed operational processor for quickly and precisely grasping two-dimensional surface profile of the object.

Other objects and advantages of the present invention will be made clear in following description of the invention detailed with reference to preferred embodiments shown in accompanying drawings.

BRIEF EXPLANATION OF THE DRAWINGS

FIG. 1 is a diagram for explaining a triangulation distance measuring arrangement employed in the optical scanning displacement sensor according to the present invention;

FIG. 4 is a flow chart of signal processing steps in a linearity correcting means employed according to the present invention in the distance measuring arrangement of FIG. 1;

FIG. 15, 15a, and 15b taken together are a flow chart of another algorithm employed in detecting level difference involved in a working object by the sensor of the present invention;

Figure 5:
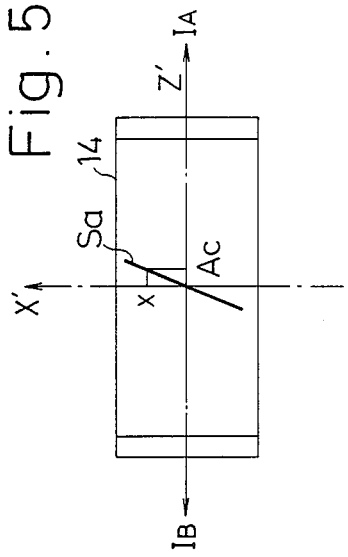
FIGS. 5 and 6 are diagrams for explaining the operation of the linearity correcting means of FIG. 4.

The present invention shall now be explained in the followings with reference to the embodiments shown in the drawings, but it should be appreciated that the intention is not to limit the invention only to these embodiments shown but is to rather include all alterations, modifications and equivalent arrangements possible within the scope of appended claims.

DISCLOSURE OF PREFERRED EMBODIMENTS

Figure 2:
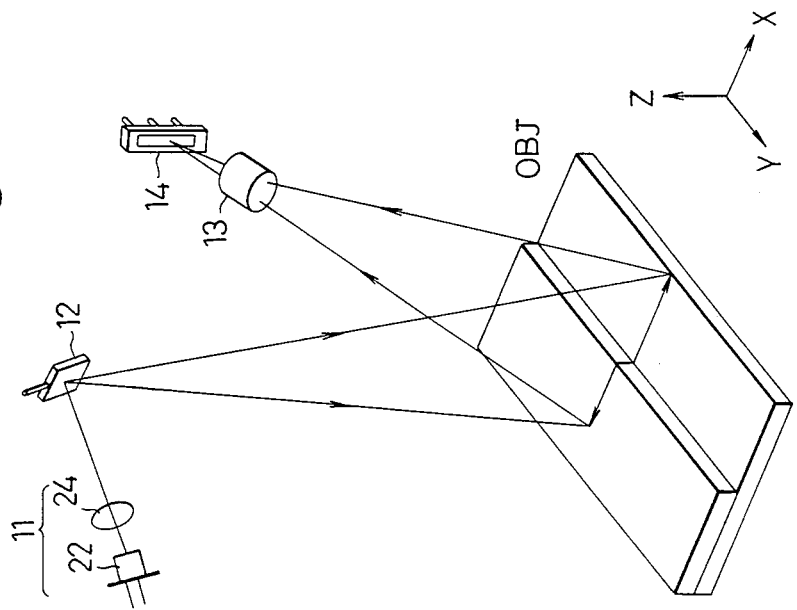
FIG. 2 is a schematic perspective view of the distance measuring arrangement of FIG. 1.

Referring now to FIGS. 1 to 2, a displacement sensor 10 of the present invention and employing a triangulation distance-measuring arrangement comprises a light projecting means 11 including a semiconductor laser, light emitting diode or the like, a deviating means 12 for deviatingly reflecting a light beam projected from the light projecting means 11 to be incident upon an object to be detected, a light receiving optical system 13 for receiving diffuse reflected light back from the object and condensing the received light, and a detecting means 14 formed by such one-dimensional position detecting element as PSD on which the optical system 13 forms a condensed light spot S. In the position detecting means 14, a pair of detected position signals $I_A$ and $I_B$ responsive to a position of the condensed light spot S are generated, and a distance of the object OBJ is operationally obtained from these position signals by means of the triangulation. As the position of the object OBJ displaces from A to B and then to C to vary the distance between the light projecting means 11 and the object OBJ, the position of the condensed light spot S formed on light receiving surface of the light receiving means 14 is caused to move from a to b and then to c, the paired position signals $I_A$ and $I_B$ are thereby caused to vary mutually in inverse proportional, and the variation in the distance of the object can be obtained from such varying position signals $I_A$ and $I_B$. When the light beam is made to scan over the surface of the object OBJ as shown in FIG. 2, it is made possible to realize the two-dimensional position detection as has been briefly referred to.

Figure 3:
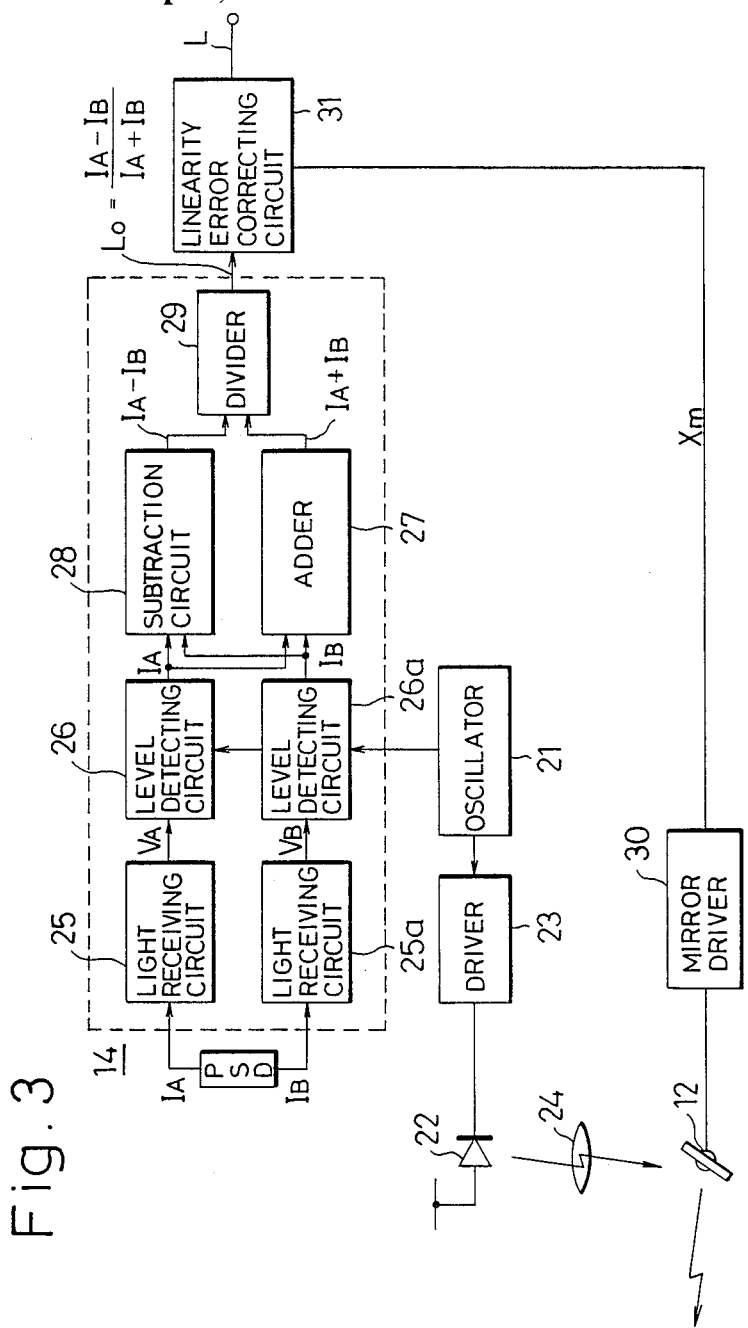
FIG. 3 is a block diagram showing a signal processing circuit in the arrangement of FIG. 1.

Referring more in details to the above arrangement with reference to FIG. 3, the light projecting means 11 of the sensor 10 comprises an oscillator 21 setting light projecting timing, a light emitting element 22 for the light projection, driver 23 for the element 22, and an optical system 24 for projecting emitted light from the element 22 in the form of a light beam. When the object OBJ is scanned by this light beam in a direction of an axis, x as in FIG. 2 through the deviating means 12, a diffusion-reflected light back from the object OBJ is condensed by the light receiving optical system 13, and the condensed light spot S is formed on the position detecting means 14 in response to the position or surface profile of the object OBJ. The position detecting means 14 provides as outputs the mutually opposite position signals $I_A$ and $I_B$ responsive to the position of the spot S, and these position signals $I_A$ and $I_B$ which are electric current signals are amplified respectively at each of light receiving circuit 25 and 25a and, as therein converted to electric voltage signals, provided to level detecting circuits 26 and 26a, where the voltage signals are subjected to a level discrimination in synchronism with clock pulses from the oscillator 21 and then to an addition and subtraction at an adder 27 for obtaining the sum of the both signals $I_A$ and $I_B$ and a subtraction circuit 28 for obtaining the difference between them, so that a first signal $I_A - I_B$ and a second signal $I_A + I_B$ will be provided. A ratio between these first and second signals is obtained at a divider 29, and a measured distance signal $Lo = \{(I_A - I_B)/(I_A + I_B)\}$ is provided out of the divider 29. Here, the displacement distance $\Delta 1$, of the object OBJ and the displacement distance $\Delta z$ are in such nonlinear relationship as has been referred to.

When the deviating means 12 is properly driven by a mirror driver 30 for scanning the surface of the object OBJ by the light beam, the condensed spot S will draw such locus Sa as shown in FIG. 5 so long as the object surface is of a flat plane vertical with respect to the axis z in FIG. 2. In FIG. 5, an axis z' is of a direction in which the condensed light spot S displaces in response to the distance variation of the object OBJ when the light beam is not performing the scanning in the direction of the axis x, and an axis x' is vertical with respect to the axis z' on the light receiving surface. Further, the locus Sa of the condensed light spot S upon the light beam scanning should be theoretically parallel to the axis x' on the position detecting means 14 but, in practice, various errors such as any distortion involved in the position detecting means 14, optical axis of the system 13, projected light beam and so on would cause the locus to have an inclination with respect to the axis x'. Upon displacement of the object OBJ in the direction of the axis z', on the other hand, the locus Sa is not to show a parallel displacement in the axis z direction while keeping a fixed inclination, but is to a displacement in the axis z' direction with varying inclination. That is, as the light beam is made to perform the scanning in the direction of the axis x, the errors occurring in the measured distance signal Lo are forming functions of both of the axes x and z.

Figure 6:
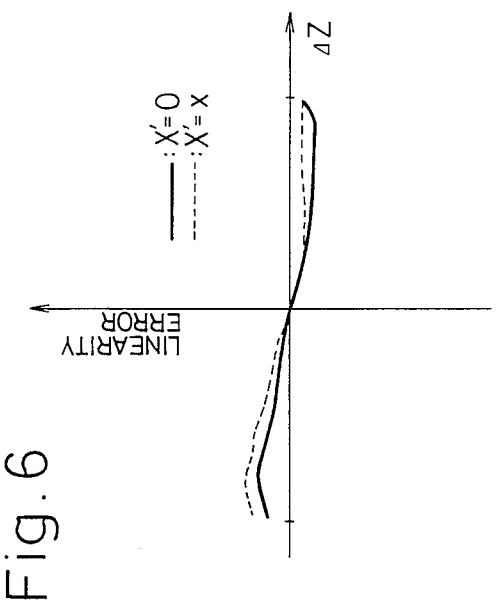
Figure 7:
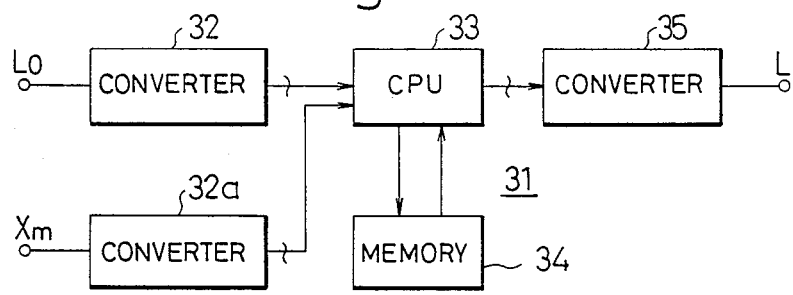
FIG. 7 is a block diagram in one working aspect of the linearity correcting means of FIG. 4.
Figure 8:
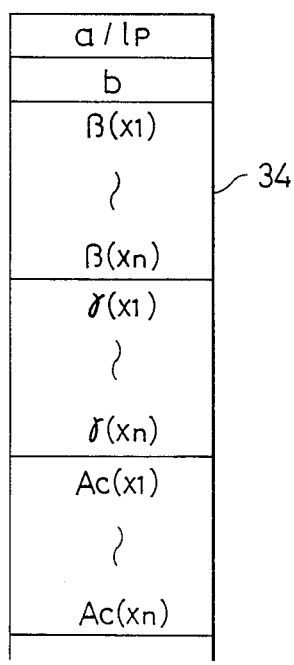
FIG. 8 is an explanatory view for stored contents in a memory of the linearity correcting means of FIG. 4.

The linearity error present in the position detecting means 14 itself will be as represented by such a solid line curve as in FIG. 6 in comparison with the linearity of the measured distance signal Lo, in an event where the condensed light spot S is displaced on the position detecting means 14 by the displacement distance $\Delta z$ in the axis z' direction. When displacing axis of the condensed light spot S is shifted in the axis x' direction on the position detecting means 14 by an amount, x, the linearity error will be as shown by a dotted line curve in FIG. 6, and the condensed light spot S shifting on the axis z' of the position detecting means 14, shows different characteristics. This is for reason that a resistor layer in the position detecting means, 14 is not of uniform resistance-value distribution which appearing as the error in the measured distance signal Lo and, as this non-uniform resistance distribution is present also in the axis x' direction of the position detecting means 14, the different shifting axis of the condensed light spot S will also cause the linearity error characteristics to vary In correcting these linearity errors, such a correcting circuit 31 as shown in FIG. 7 is employed. In the present case, the linearity correcting circuit 31 receives the measured distance signal Lo from the divider 29, as well as a scanning angle signal Xm from the mirror driver 30 of the deviating means 12 for the light beam scanning, as seen also in FIG. 3. These input signal Lo and Xm are converted into digital signals at A/D converters 32 and 32a, respectively, and the digital signals are then provided to a CPU 33 which reads correction data out of a memory 34, the data corresponding to the measured distance signal Lo and scanning angle signal Xm. The correction data for the linearity correction of the measured distance signal Lo and for correcting the linearity error in respect of the axis x direction by the scanning angle signal Xm are preliminarily stored in the memory 34, and the CPU 33 corrects both input data on the basis of the correction data thus read out of the memory 34, and the corrected signals are provided to a D/A converter 35, where the digital signals subjected to the correction are converted again into analog signals, and a linearity corrected measured distance signal L is provided out of the D/A converter 35.

According to a remarkable feature of the present invention, a value of an inverse function $\Delta 1(Lo)$ of a function $Lo(\Delta 1)$ for computing the first signal, which being the measured distance signal Lo, with the displacement distance $\Delta 1$ as a variable of the object OBJ is computed, and the second signal, being the corrected measured distance signal L proportional to the displacement distance $\Delta 1$ of the object OBJ is computed by multiplying the first signal by a signal obtained by adding to the inverse function $\Delta 1(Lo)$ a constant b.

More specifically, the measured distance signal Lo can be represented, in view of the foregoing formulas (1) and (2), by a following formula:

$$(I_A - I_B)/(I_A + I_B) = \Delta z / l_P = a \cdot \Delta 1 / \{(l_P(b + \Delta 1)\} \quad (3)$$

That is, the measured distance signal Lo is the function $Lo(\Delta 1)$ of the distance $\Delta 1$ and, solving this formula (3) in respect of $\Delta 1$, $$\Delta 1(Lo) = (b \cdot Lo)/\{(a/l_p) - Lo\} \quad (4)$$

and the distance $\Delta 1$ will be a function of the signal Lo. This function $\Delta 1(Lo)$ is an inverse function of the function $Lo(\Delta 1)$ shown by the formula (3), and a correction value as follows is obtained by adding the constant b to the inverse function:

$$\alpha(Lo) = \Delta 1(Lo) + b \quad (5)$$

This correction value may be obtained theoretically from the value of the measured distance signal Lo and, multiplying the formula (3) by the formula (5):

$$L = Lo \cdot \alpha(Lo) = [(a \cdot \Delta 1)/\{l_p(b+\Delta 1)\}] \cdot (\Delta 1 + b) = (a/l_p) \cdot \Delta 1 \quad (6)$$

As will be clear from this formula (6), the measured distance signal Lo is linearized and the measured distance signal L proportional to the displacement distance $\Delta 1$ can be obtained. That is, the linearization is performed by operating the formulas (4) and (5) with the measured distance signal Lo to obtain the correction value $\alpha(Lo)$, and multiplying the measured distance signal Lo by the correction value $\alpha(Lo)$. In other words, the linearization can be thereby completely carried out so long as all components of the sensor involve no precision fluctuation and the constants a and b correspond to design values.

In practice, however, the sensor components cannot be free of the precision fluctuation in general, and this respect must be taken into consideration, and in view of the formula (1) it will be appreciated that such precision fluctuation or any assembling error is contributive to the constants a and b. Assuming here that the constants in a state involving the fluctuation are a' and b', then the formula (3) will be $$Lo = (a' \cdot \Delta 1)/\{l_p(b' + \Delta 1)\} \quad (7)$$

It should be here assumed that a correction value of the constant b is $\beta$ and a correction value of the other constant a is $\gamma$, and they are defined as $$\beta = b' - b, \quad \gamma = a/a' \quad (8)$$

When both of the formula (7) are multiplied by $\alpha$, $\beta$ and $\gamma$, respectively, as in the followings, $$\begin{aligned} L &= Lo \{\alpha(Lo) + \beta\} \cdot \gamma \\ &= [a' \cdot \Delta l / \{l_p(b' + \Delta l)\}] \cdot (\Delta l - b + b' - b) \cdot (a/a') \\ &= (a/l_p) \cdot \Delta l \end{aligned} \quad (9)$$

and the measured distance signal Lo is linearized. That is, the measured distance signal Lo is subjected to the operation of the formulas (4) and (5) to obtain the theoretical correction value $\alpha(Lo)$, the further correction values $\beta$ and $\gamma$ obtained with respect to the components' fluctuations are added to the correction value $\alpha(Lo)$, such operation as the formula (9) is carried out, and the linearity error in the axis z direction can be thereby corrected.

Referring further to the correction of the linearity error in the axis x direction, the locus Sa of the condensed light spot S on the light receiving surface of the position detecting means 14 will be as shown in FIG. 5, but a measured distance value at the time when the condensed light spot S passes through the axis z during the scanning of the light beam can be linearized by operating the formula (9). Assuming here that, in an event when the condensed light spot S on the axis z' of the position detecting means 14 passes through the center of the means 14, a deviation in the axis z' direction upon a displacement x in the axis x' direction of the spot S is to be Ac(x), and that the constants a and b of the formula (1) with x'=x are a'' and b'', respectively, then the formula (3) will be $$Lo' = Lo + Ac(x) = [a'' \cdot \Delta 1/\{l_p(b'' + \Delta 1)\}] + Ac(x) \quad (10)$$

Here, the correction value of the constant b is assumed to be $\beta(x)$, the correction value of the constant a to be $\gamma(x)$, and they are defined to be $$\beta(x) = b'' - b \text{ and } \gamma(x) = a/a'' \quad (11)$$

When both sides of the formulas (11) are multiplied by $\alpha(Lo)$, $\beta(x)$, $\gamma(x)$ and $Ac(x)$, then $$\begin{aligned} L &= \{Lo' - Ac(x)\} \{\alpha(Lo) + \beta(x)\} \gamma(x) \\ &= (a'' \cdot \Delta l)/\{l_p(b'' + \Delta l)\} \cdot (\Delta l + b + b'' - b) \cdot (a/a'') \\ &= (a/l_p) \cdot \Delta l \end{aligned} \quad (12)$$

and, as shown by this formula (12), the measured distance signal Lo' is here linearized. That is, the linearization in the axis x direction is to be realized by obtaining the measured distance signal $Lo = Lo' - Ac(x)$ from the signal Lo' and the scanning angle Xm for this signal, adding to the correction value $\alpha(Lo)$ the correction values $\beta(x)$ and $\gamma(x)$ obtained on the basis of the components' fluctuations, and operating the formula (12).

In the memory 34, in this case, such constants required for the operation of the formula (12) as $a/l_p$, b, $\beta(x)$, $\gamma(x)$ and $Ac(x)$ are preliminarily stored. In these constants, $a/l_p$ and b are determined by computations with set values while $\beta(x)$, $\gamma(x)$ and $Ac(x)$ are correction constants specific to the components of the sensor 10 and, as the operation may be performed in accordance with the flow chart of FIG. 4 with these constants employed, it suffices the purpose to store only these constants as the correction value data. Provided that the memory 34 is to store such data in conventional matrix mode and is to be provided with resolving powers in full-scale of 1/4,000 in the axis z direction and 1/1,000 in the axis x direction, then the memory 34 is required to store 4,000,000 data of the correction values so that the memory capacity required is very large to render the entire device to become also large. According to the present invention, however, the memory capacity can be remarkably reduced as will be clear in view of the above. That is, while the correction values $\beta(x)$, $\gamma(x)$ and $Ac(x)$ are the constants depending on the scanning angle signal Xm and their required number should depend on the resolving power of the angle signal Xm, the error involved in the scanning in the axis x direction is normally not much remarkable so that, when the constants are set for every proper section of the angle signal Xm, required memory space can be remarkably compressed. For example, the angle signal Xm is to be divided into 100 sections with respect to the resolving power 1/1,000 of the angle signal so that 100 correction constants will be stored for the respective sections, and the memory space can be remarkably compressed.

Figure 9:
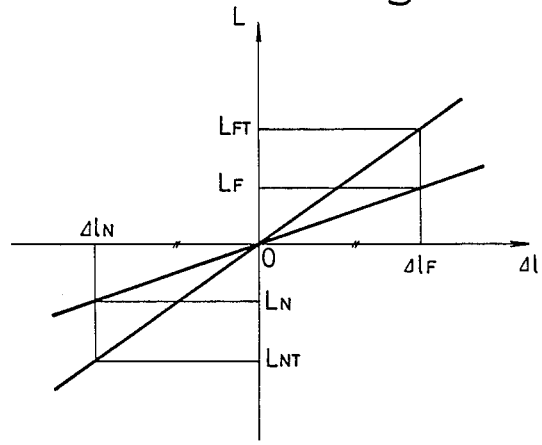
FIG. 9 is a diagram for explaining the operation of the means of FIG. 4.

The adjusting work can be also simplified to a large extent. When it is assumed that a displacement on a far side with respect to a reference distance $1c$ is $\Delta l_F$ and a near side displacement is $\Delta l_N$, as shown in FIG. 9, and that the object OBJ is at positions satisfying $$\Delta l_F = \Delta l_N \quad (13)$$

that is, the positions where the far side and near side displacements are equal to each other, their measured distance signals $L_F$ and $L_N$ will be of a magnitude $|L_F| = |L_N|$ when correctly linearized. Since $L_F > 0$ and $L_N < 0$, the above formula may be presented as follows:

$$L_F = -L_N \quad (14)$$

By performing the adjustment with this characteristic utilized, the adjusting work can be easily carried out. In this case, the both measured distance signals $L_F$ and $L_N$ may be presented, by means of the operational formula (12), as follows:

$$L_F = \{L_{OF} - Ac(x)\}\{\alpha F + \beta(x)\}\gamma(x), \text{ and}$$

$$L_N = \{L_{ON} - Ac(x)\}\{\alpha N + \beta(x)\}\gamma(x) \quad (15)$$

Substituting the formula (14) for the formula (15) and erasing $\gamma(x)$, the correction value $\beta(x)$ is obtained:

$$-\{L_{OF} - Ac(x)\}\{\alpha F + \beta(x)\} = \quad (16)$$

$$\{L_{ON} - Ac(x)\}\{\alpha N + \beta(x)\}$$

$$\beta(x) = -[\{(L_{OF} - Ac(x))\alpha F + (L_{ON} - Ac(x))\alpha N\}/(L_{OF} + L_{ON} - 2Ac(x))]$$

That is, by operating the formula (12) with such correction value $\beta(x)$ as can be obtained by the formula (16), the measured distance signal Lo' can be linearized. Assuming further that a correct measured distance signal at the displacement $\Delta l_F$ is $L_{FT}$, then the correction value $\gamma(x)$ for the inclination may be obtained, depending on the scanning angle signal Xm, by a formula $$\gamma(x) = L_{FT}/\{(L_{OF} - Ac(x))\cdot(\alpha F + \beta(x))\} \quad (17)$$

The inclination is corrected by means of the thus obtained $\gamma(x)$, and a linearized measured distance signal L can be obtained. In carrying out the adjustment, therefore, an origin is determined by placing a flat place at the position of the reference distance $1c$ to be perpendicular with respect to the light beam axis, the correction value $Ac(x)$ in the case of the light beam scanning is initially obtained, and then the inclination correction value $\gamma(x)$ may be obtained by means of the formula (16) from measured distance signals $L_{OF}$ and $L_{ON}$ respectively with respect to the scanning angle signal Xm for each case of the both displacements of the equal far side and near side positions $\Delta l_F = \Delta l_N$ to which positions the flat plate are displaced in parallel to each other.

Thus, the correction values $\beta(x)$, $\gamma(x)$ and $Ac(x)$ specific to the components of the optical scanning displacement sensor 10 can be obtained simply by obtaining the data $L_{ON}$, $L_{OF}$ and $Ac(x)$ with respect to the scanning angle signal Xm by displacing the object OBJ twice, and thereafter computing $\beta(x)$ and $\gamma(x)$ by means of the formulas (16) and (17), whereby required time for the adjustment and manufacturing costs can be effectively be reduced.

In the present invention, further, such a high speed processor as, for example, a digital signal processor MN1911 may optimumly be employed for the operation of FIG. 4. Provided in this case that the object OBJ is to be subjected to reciprocating scannings performed 50 times per 1 sec. while required scanning time in one direction is 10 ms and reciprocating span is divided into 1,000 sections, then the time assigned to each section is 10 $\mu$s and, in carrying out the linearization under the foregoing conditions, it becomes necessary to practice the operation of FIG. 4 within 10 $\mu$s. According to the high speed processor, such operation can be realized. According to the optical scanning sensor 10 as has been referred to, further, it will be appreciated that, in addition to the displacement of the object OBJ, the surface profile of the object involving such level difference as shown in FIG. 2, or any gap between a pair of working objects, can be easily detected.

Figure 10:
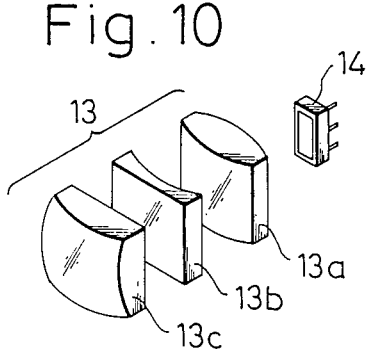
FIG. 10 shows in a perspective view as disassembled an anamorphic optical system employed in the sensor of the present invention.
Figure 11:
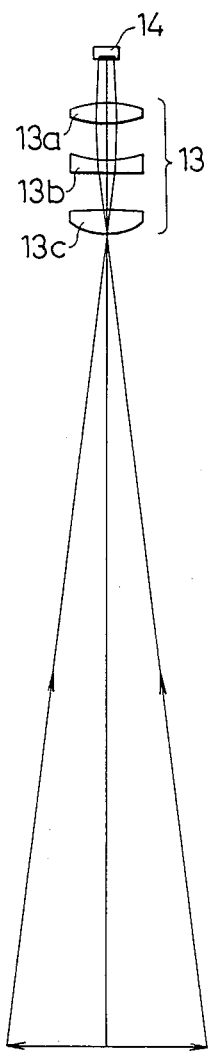
FIG. 11 is an operation explanatory view for the anamorphic optical system of FIG. 10.

According to another remarkable feature of the present invention, there is taken a measure for reducing displacing width of the condensed light spot on the light receiving surface of the position detecting means 14, so that the light receiving optical system can be minimized in size in addition to that of the operational means as has been referred to. Referring to FIGS. 10 and 11, there is employed as the light receiving optical system 13 an anamorphic optical system, which comprises an ordinary convex lens 13a, a cylindrical concave lens 13b and a cylindrical convex lens 13c. In this optical system, the cylindrical concave and convex lenses 13b and 13c have respectively a curved surface corresponding to a peripheral surface of a column having an axis parallel to longitudinal axis of the position detecting means 14, whereby the displacing width of the condensed light spot in latitudinal, width direction is compressed and the magnification in the latitudinal direction is made different from that in the longitudinal direction, while the main point positions are made different so that image forming positions in the both directions will coincide with each other.

As will be clear from FIG. 11, the range in which the condensed light spot is projected on the light receiving surface of the position detecting means 14 with respect to the range of the light beam scanning onto the surface of the object OBJ is kept within the latitudinal width direction of the position detecting means 14, that is, the distance variation between the light projecting means 11 and the surface of the object is relatively small in the width direction of the means 14, whereas the scanning width of the projected light beam is kept relatively larger. In the position detecting means 14, on the other hand, the displacing width of the light beam with respect to the distance variation of the object OBJ is made large to elevate the detecting precision, and received light amount can be made larger by making the displacing width of condensed light beam due to the light beam scanning to be smaller. With the anamorphic optical system employed for receiving the reflected light, therefore, it is made possible to receive substantially all of the reflected light in the width direction of the position detecting means even in carrying out the two-dimensional position detection with the light beam scanning, and the utilizing efficiency of the light can be sufficiently elevated. Consequently, it is made possible to even lower required sensitivity of the circuit for processing the output signals of the position detecting means 14, and thus to reduce undesirable influence of any external light disturbance to a remarkable extent.

According to still another remarkable feature of the present invention, the optical scanning displacement sensor according to the present invention is utilized for a detection of a gap between a pair of working members, so as to be capable of contributing to excellent welding work for such members. That is, the welding work carried out with respect to the paired working members with an assumption that no gap is present between them will result in a lack of welding strength at a position where a relatively large gap is present between the members, whereas the work carried out with a welding torch swung in an assumption that a gap is present to a predetermined extent will have to keep the torch swung even at positions where the gap is practically not present so as to prolong welding time unnecessarily. When the presence or absence of the gap is accurately detected prior to the welding work, however, the joining welding of the members can be optimumly realized.

Figure 12:
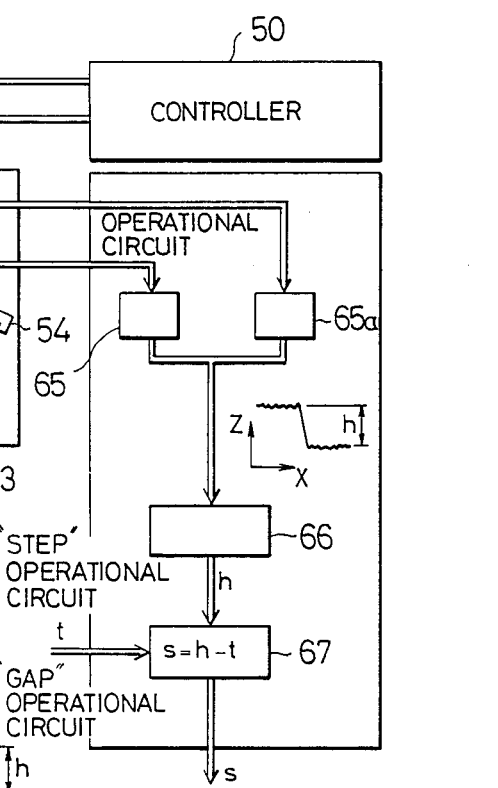
FIG. 12 is a diagram for explaining a working aspect of the sensor according to the present invention which is employed in a welding performed with respect to a pair of objects to be worked.

Referring now to FIG. 12, a light projecting means 51 driven by a controller 50 projects a light beam which is irradiated upon a light deviating means 52 which is similarly actuated by the controller 50. The light beam reflected by the deviating means 52 is made to pass through a half-mirror 52a and to be incident upon a pair of working objects OBJ. Diffusion reflected light back from the working objects OBJ is condensed through a light receiving optical system 53 to form a condensed light spot S on a position detecting means 54 in response to a position of the respective objects. The light beam from the means 52 is partly reflected at the half-mirror 52a to be incident upon the other position detecting means 54a. The former position detecting means 54 provides an output signal of an electric current depicting positional information in the direction of the axis z upon scanning of the light beam over the working members OBJ, whereas the latter position detecting means 54a provides a displacement signal in the direction of the axis x of the light beam.

The both positional signals from the position detecting means 54 and 54a are provided to operational circuits 65 and 65a for obtaining a measured distance signal Lo, and these operational circuits 65 and 65a provide a preferably linealized measured distance signal L to a "step" operational circuit 66. If a step h is present in the paired working members OBJ, this step h is operated to be conveyed to a "gap" operational circuit 67 at a next stage. In this "gap" operational circuit 67, a signal t denoting the thickness of the respective working objects OBJ is preliminarily provided, and an operation (S=h−t) for determining a gap S between the paired objects is carried out. According to the present arrangement, therefore, the gap S present between the paired objects can be easily detected through a non-contacting optical measure, and the paired objects can be optimumly welded together under a properly set welding condition in response to the detected gap S.

It will be appreciated that, with this arrangement, further, the surface profile or any stepped part in the working object can be detected, and the welding can be realized at a high precision, responsive to the surface profile in the welding zone.

In detecting the stepped part as in the foregoing, it is possible to employ various algorithm, according to the present invention. It should be assumed in such algorithm of the stepped part detection as in FIG. 13 that the linearized measured distance signal L has been operated and distance data Z(I) has been already provided from the foregoing optical scanning displacement sensor 10. When this algorithm is started, variables to be employed for later discriminations are initialized at a step (1). That is, a variable DZSUM denoting an adding value of a difference is made 0, a variable DZMAX denoting the maximum value of the adding value is made 0, a present scanning position I is made 1, and a scanning position J where the addition of the difference is initiated is made 1. At a next step (2), a difference DZ(I)=Z(I+1)−Z(I) between a distance data Z(I) at a scanning position I and another distance data Z(I+1) at an adjacent position (I+1) is obtained. At a further step (3), a discrimination is made whether or not to difference DZ(I) is zero and, if DZ(I)=0, the algorithm shifts directly to a step (9) for data clear discrimination since any further processing of code coincidence discrimination or an addition of the difference is meaningless, while the algorithm proceeds to a step (4) if DZ(I)≠0, to perform the code coincidence discrimination.

At the step (4), the discrimination is made whether or not a code of the difference DZ(I) at the present scanning position I accords with a former code of a difference DZ(I−1) at the last position and, in case of the coincidence, the algorithm proceeds to a step (5) but, in case of non-coincidence, to a step (6). To be concrete, the step (5) is reached when DZ(I)×DZ(I−1)>0 and the step (6) is reached when DZ(I)×DZ(I−1)<0. Further, the step (5) is reached unconditionally when I=1, and an event of the last difference DZ(I−1) is zero is subjected to a comparison with the last but one difference DZ(I−2). At the step (5), an absolute value |DZ(1)| of the difference DZ(I) at the present scanning position I is added to a variable DZSUM, and the step (9) is reached. In an event where the coincidence of the difference DZ(I) code keeps continuing at the step (4), the addition of the absolute value |DZ(I)| of the difference DZ(I) to the variable DZSUM continues, and a sum value of the variable DZSUM and the difference DZ(I) of continuously according code is to be obtained.

At the step (6), whether or not the variable DZSUM is larger than the variable DZMAX is determined. If DZSUM>DZMAX, it proceeds to a further step (7), but a determination of not DZSUM>DZMAX renders the procedure to skip over to a still further step (8). At the step (7) where DZSUM>DZMAX, a substitution of a value of the variable DZSUM for the variable DZMAX is made so as to render the sum value of the differences obtained up to the present scanning position I to be the maximum one of the sum value. Further, in order to store a value J of a scanning position where the addition for obtaining the maximum sum value DZMAS has been initiated, as a proposed position N1 for a starting edge of the stepped part, as well as the present scanning position I where the addition has terminated, as a proposed position N2 for a terminating edge of the stepped part, a substitution of variables N1 and N2 with values of variables J and I is made.

At the step (8), the addition of difference is to be newly started by a substitution of the sum difference value DZSUM with the absolute value |DZ(I)| of the difference DZ(I) at the present scanning position I, and by a substitution of the scanning position J where the addition has been started with the present scanning position I. At the step (9), it is determined whether the processing has been completed with respect to all of the data. To be concrete, it is discriminated if a scanning position I=N−1 has reached or not. If I≠N−1, then it proceeds to a step (10), to have the scanning position I advanced and the processing at the step (2) and followings repeated. When I=N−1, on the other hand, the stepped part detecting process is terminated, the proposed positions N1 and N2 are eventually treated as the practical starting and terminating edges of the stepped part, and coordinates X(N1) and Z(N1) as well as X(N2) and Z(N2) are provided as outputs. In these coordinates, the ones Z(N1) and Z(N2) of the distance data are compared with each other to use the one of a smaller distance as a tracing coordinate, and an absolute value of the difference in these distance data is operated to determine the step $h = |Z(N2) - Z(N1)|$. Subtracting the plate thickness t from the step h, the gap $S = h - t$ between the paired working objects to be joined is operated, and these data are provided to an automatic welding robot.

Figure 14:
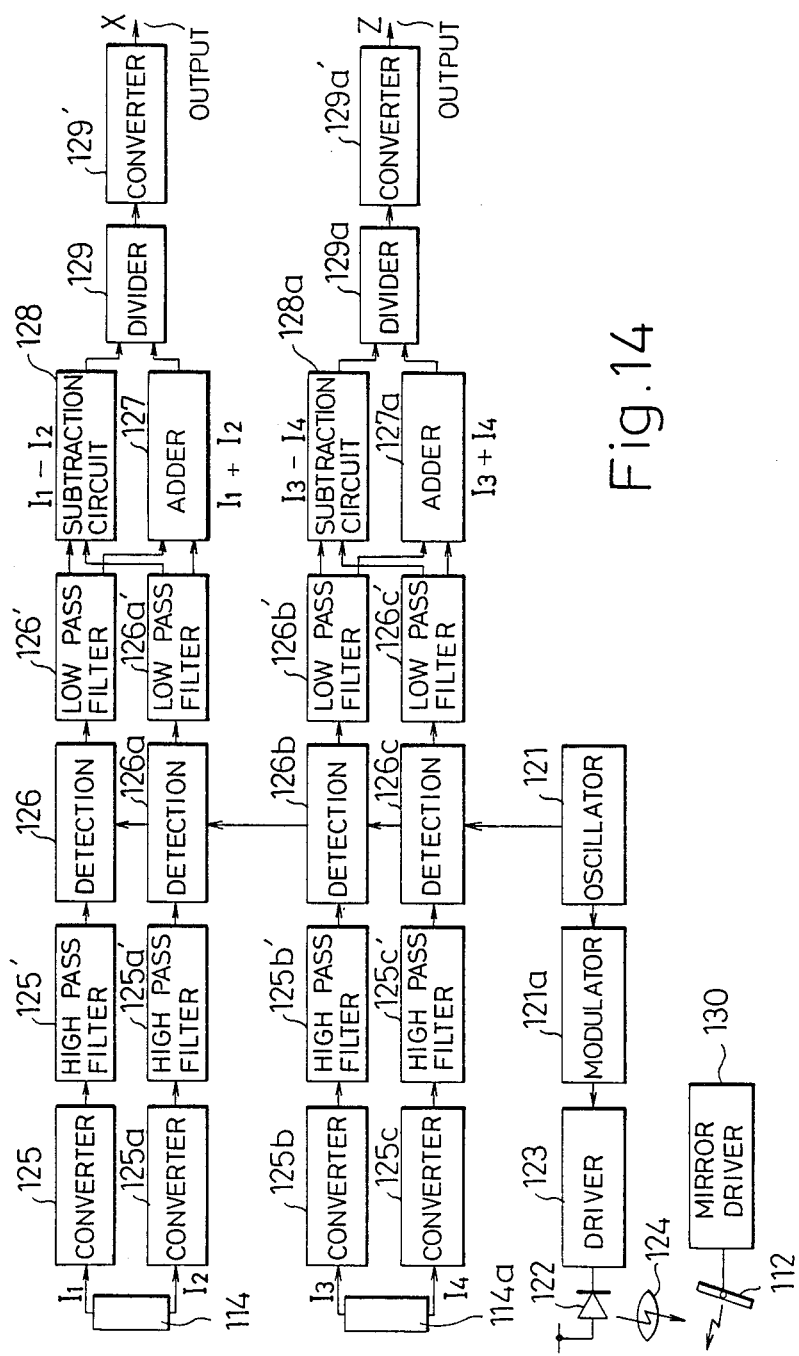
FIG. 14 is a block diagram of a signal processing circuit employed in the sensor of FIG. 13.

In obtaining the distance data X and Z, such operational circuit as shown in FIG. 14 may be employed. This circuit of FIG. 14 corresponds substantially to a parallel arrangement of a pair of such circuits as shown in FIG. 3, and is further provided, while not shown here, with means for linearizing the measured distance signal L. In the arrangement of FIG. 14, a pair of position detecting means 114 and 114a may be the same as, for example, the position detecting means 54 and 54a in the optically scanning displacement sensor of FIG. 12, and position signals $I_1$, $I_2$ and $I_3$, $I_4$ provided out of these means 114 and 114a are given respectively to I/V converters 125, 125a and 125b, 125c and, through high pass filters 125'−125c', to level discriminating detectors 126−126c in synchronism with clock pulses from an oscillator 121. The position signals $I_1$ through $I_4$ detected at the detectors 126−126c are provided, through low pass filters 126'−126c' to adders 127 and 127a as well as subtraction circuits 128 and 128a for such addition and subtraction as $I_1 - I_2$, $I_1 + I_2$; $I_3 - I_4$, $I_3 + I_4$, then to dividers 129 and 129a for operations of $(I_1 - I_2)/(I_1 + I_2)$; $(I_3 - I_4)/(I_3 + I_4)$ and finally, as linearized, to converters 129' and 129a' to be D/A converted and provided as output distance data X and Z. In this arrangement of FIG. 14, such operating aspect as that the oscillator 121 energizes, through a modulator 121a and driver 123, a light emitting element 122 for the light projection through a light projecting optical system 124 while actuating a light deviating means 112 by a mirror driver 130, is substantially the same as in the foregoing embodiments.

Figure 16:
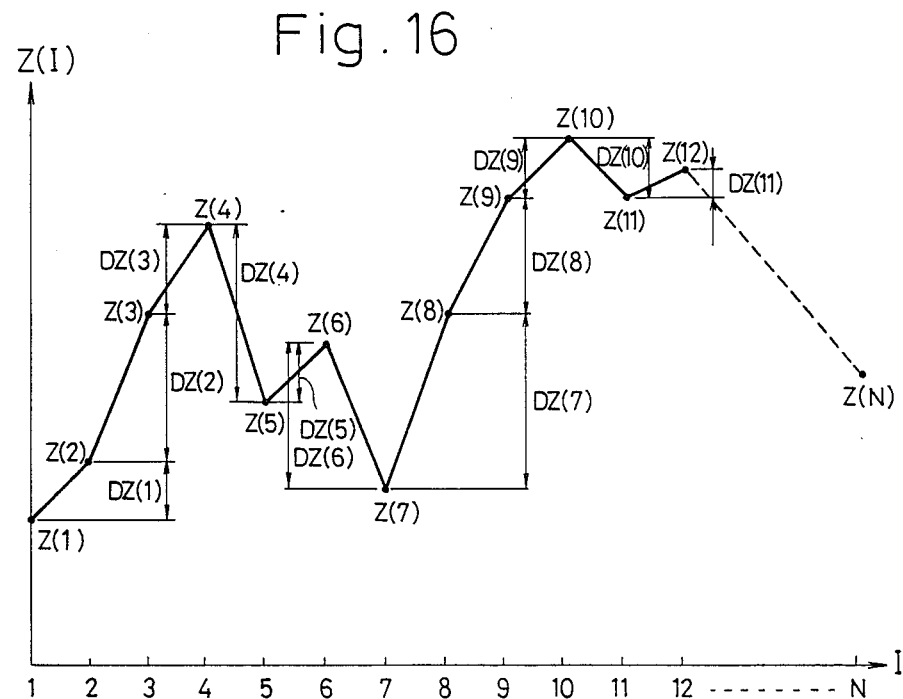
FIGS. 16 to 19 are respectively an operation explanatory view of the sensor according to the present invention.

In the present invention, further, such a cumulative system of the differences as will be clear from FIG. 16 is employed for carrying out the stepped part detection and such algorithm as in the foregoing is executed. That is, the system is executed in such that, for the distance data Z(I), its difference $DZ(I) = Z(I+1) - Z(I)$ is operated with respect to I=1, 2, ... N−1, thus obtained differences are added cumulatively so long as their code is sequentially identical and, when their sum value has become the maximum, corresponding scanning position I is discriminated as being the step value. According to this system, it becomes possible to discriminate reliably the largest step Z(10)−Z(7) even when such a relatively large difference DZ(2) or DZ(4) as seen in FIG. 16 is present, without erroneously discriminating the latter to be the step, so that the scanning positions I=7, 10 will be known as the stepped part.

Figure 13:
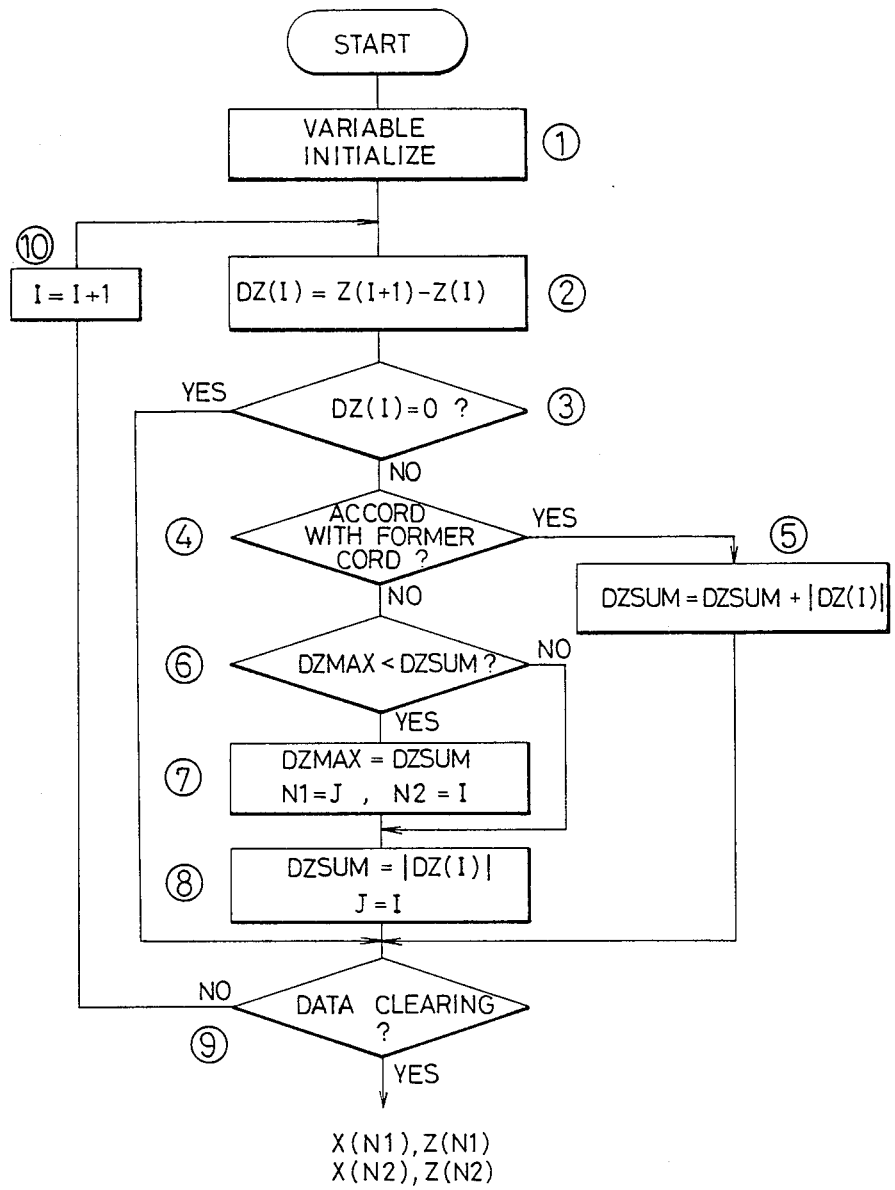
FIG. 13 is a flow chart of an algorithm employed in detecting a stepped part or level difference in working object by the sensor according to the present invention.
Figure 15B:
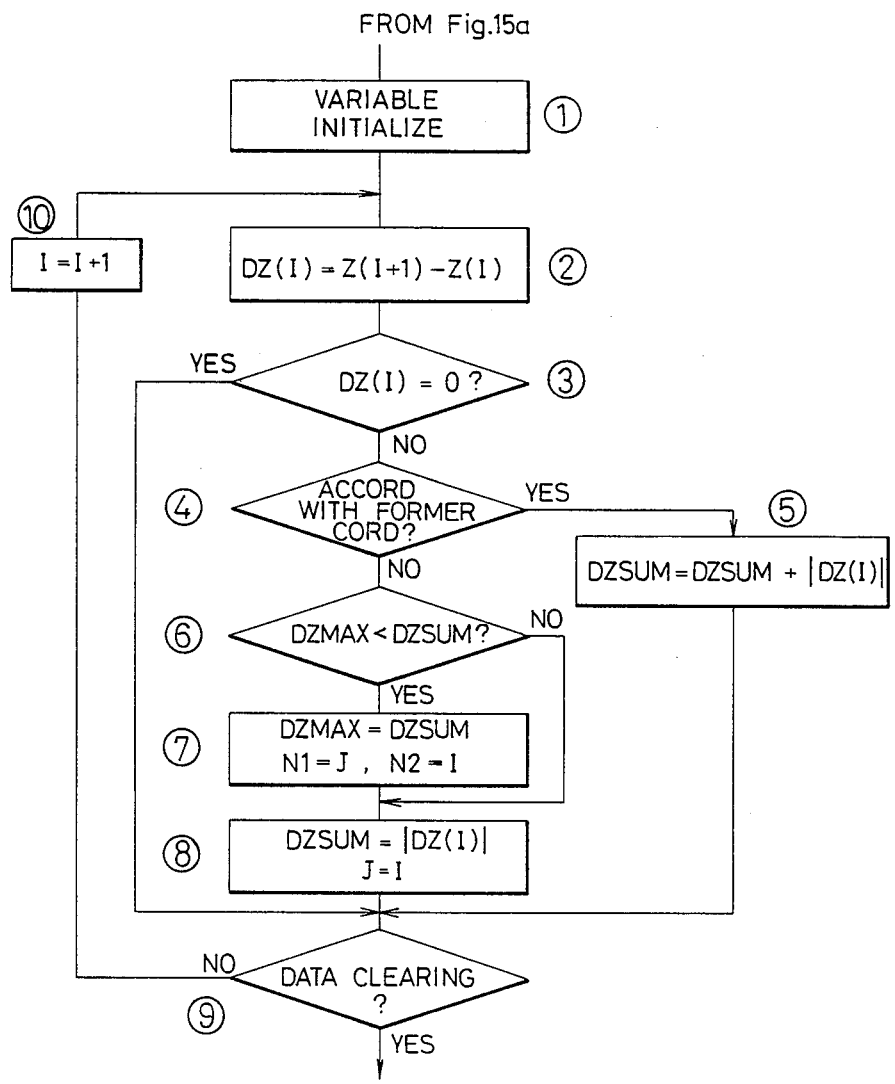

In FIG. 15, an algorithm for detecting the step in another aspect is shown, in which the processing time is shortened in such that the distance data differences $DZ(I) = Z(I+\Delta N) - Z(I)$ at every predetermined scanning section $\Delta N$ in the distance data Z(I) are taken at steps #1 to #10, they are added so long as their code is the same, and a scanning section M1 to M2 where the sum value of the added differences has become the maximum is obtained. Except that the interval for taking the difference is expanded from 1 pitch to N pitch, these processed contents at the steps #1 to #10 are substantially identical to the processing in FIG. 13, and the step detection can be realized at a higher speed due to the expanded interval of taking the difference. In this manner, the scanning section M1 to M2 in which the step detection is included is preliminarily limited, and the same processing steps (1) to (10) as shown in FIG. 13 are further executed again with respect to scanning range $M1 - \Delta N$ to $N2 + \Delta N$ slightly wider than the section M1 to M2. That is, the difference $DZ(I) = Z(I+1) - Z(I)$ of the respective distance data Z(I) is taken only with respect to the scanning range $M1 - \Delta N$ to $M2 + \Delta N$, they are added so long as their code is the same, and the scanning positions N1 and N2 where the absolute value of the sum value DZSUM is the maximum are discriminated as the stepped part. Since the processing at the steps (1) through (10) is of a narrow interval for taking the difference, it is made possible to realize a high precision step detection.

Figure 17:
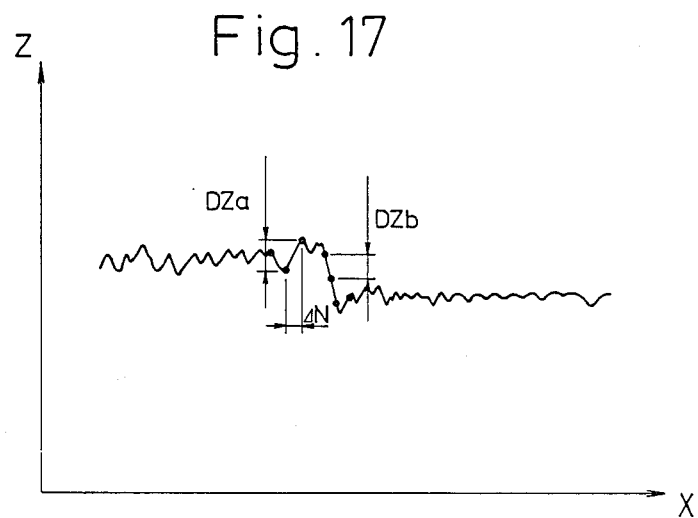
Figure 18:
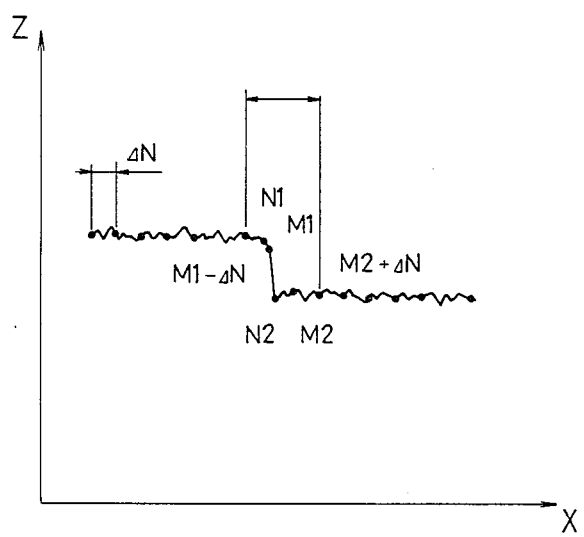

According to the algorithm of FIG. 15, as will be clear when FIGS. 17 and 18 are compared with each other, a high speed and still high precision step detection is made possible by executing the first step detection at a coarse pitch and the second detection at a fine pitch with the same algorithm employed. In the first step detection, further, it is sufficient to take into account only the range in which the stepped part N1 and N2 is really and truly present, and simply a certain fixed range before and after a point where the absolute value of the difference $DZ(I) = DZ(I + \Delta N) - DZ(I)$ is the maximum may be discriminated as being the range in which the step is present.

Figure 19:
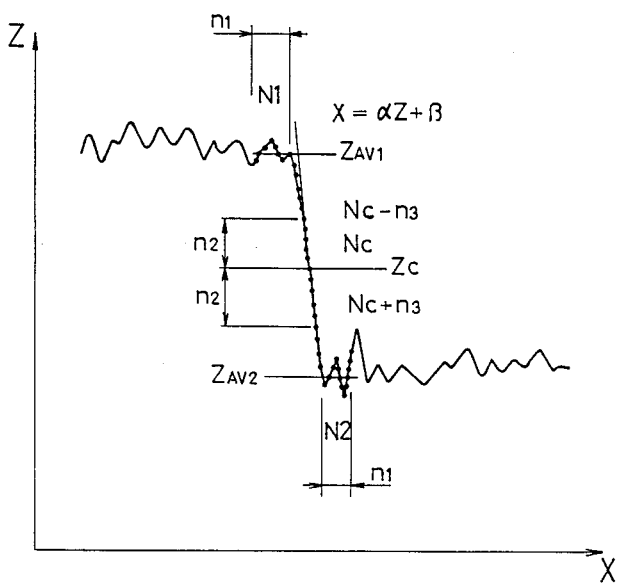

Referring to FIG. 19, there is shown a diagram according to still another algorithm, in which the discrimination of the stepped part is more precisely carried out. Thus, the distance data for upper and lower parts $Z_{AV1}$ and $Z_{AV2}$ are obtained through an average processing from a predetermined plurality number of data on outer side than both starting and terminating positions of assumed stepped part for a section N1 to N2 in which the sum value of the differences added is the maximum, an inclination $\alpha$ is obtained for this assumed stepped part through an average processing of a predetermined number of data in an intermediate portion of the assumed stepped part, and both end positions of a true stepped part are computed on the basis of these data.

More specifically, the starting end and terminating end of the assumed stepped part are obtained by means of the algorithm shown in FIG. 13, and then the upper part distance data $Z_{AV1}$ is obtained through the average processing of the predetermined number of data for the outer side from the starting end N1 of the assumed stepped part. That is:

$$Z_{AV1} = \{1/(n1 + 1)\} \sum_{I=N2-n1}^{N1} Z(I)$$

Similarly, the lower part distance data $Z_{AV2}$ is obtained through the average processing of the predetermined number of data for the outer side from the terminating end N2 of the assumed stepped part. Thus:

$$Z_{AV2} = \{1/(n1 + 1)\} \sum_{I=N2-n1}^{N2} Z(I)$$

An average value of these upper and lower part distance data $Z_{AV1}$ and $Z_{AV2}$ is obtained next:

$$Z_c = (Z_{AV1} + Z_{AV2})/2$$

A scanning position $I=Nc$ having the distance data $Z(I)$ which is the closest to the average distance $Z_c$ of the upper and lower parts is determined to be the center of the stepped part. Employing all coordinates $\{(X(Nc-n2), Z(Nc-n2)\}$ to $\{X(Nc+n2), Z(Nc+n2)\}$ of the center point Nc of the stepped part and $\pm n2$ points before and after the center point, constants $\alpha$ and $\beta$ of a linearity approximate expression $X=\alpha Z+\beta$ are determined. Substituting $Z=Z_{AV1}, Z_{AV2}$ for this expression, the both ends of the true stepped part $(\alpha Z_{AV1}+\beta, Z_{AV1})$ and $(\alpha Z_{AV2}+\beta, Z_{AV2})$ are computed. Also, the step $h=|Z_{AV1}-Z_{AV2}|$ is to be obtained here.

While in this algorithm the constants $\alpha$ and $\beta$ are determined for the linearity approximate expression on the basis of $(2_{n2}+1)$ coordinate data, the approximation may be made by a straight line coupling between two points when no sufficient operating time is allowed. In FIG. 9, further, a line connecting a coordinate $\{X(Nc-n3), Z(Nc-n3)\}$ and a coordinate $\{X(Nc+n3), Z(Nc+n3)\}$ may be employed for the above approximate expression.

Figure 20:
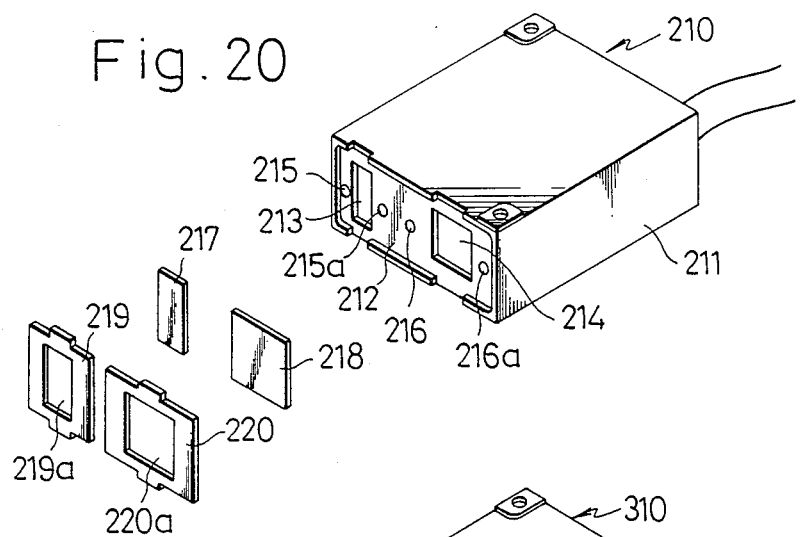
FIGS. 20 and 21 are perspective views as disassembled of a protective cover means in different working aspects and employed in the sensor according to the present invention.
Figure 21:
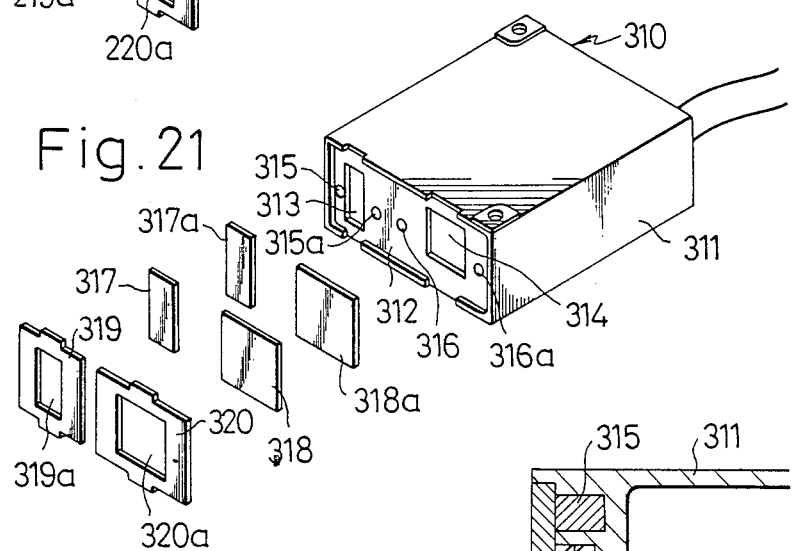
Figure 22:
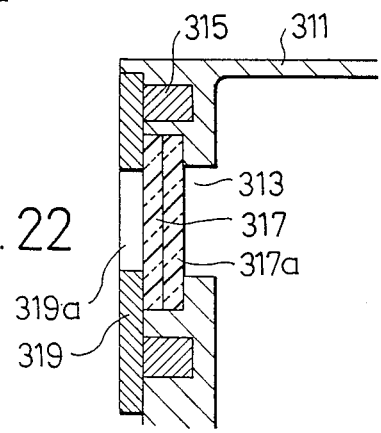
FIG. 22 is a fragmentary sectioned view of a casing of the sensor in FIG. 21.

According to a still further remarkable feature of the present invention, there is provided a protective cover arrangement effective when the optically scanning displacement sensor according to the present invention is employed in the welding of the working objects. Referring to FIG. 20, an optically scanning displacement sensor 210 includes a casing 211 which is provided at front surface 212 with a light projecting aperture 213 for projecting a light beam from the light projecting optical means (not shown) in the casing and with a light receiving aperture 214 for allowing reflected light to be incident on the light receiving optical means (not shown) in the casing. Adjacent both sides of these apertures 213 and 214, two pairs of permanent magnets 215, 215a and 216, 216a are secured to the casing, and protecting cover plates 217 and 218 respectively of a transparent optical plastic material are fitted to the apertures 213 and 214. In this case, fitting frames 219 and 220 of a ferromagnetic material and having apertures 219a and 220a matching to the apertures 213 and 214 of the casing are fitted over the protective cover plates 217 and 218 with respect to the permanent magnets 215, 215a and 216, 216a, so that the cover plates 217 and 218 can be fixedly held between the front surface 212 of the casing 211 and the fitting frames 219 and 220. When the frames 219 and 220 are made to have engaging projections while the casing 211 is provided with engaging notches or recesses for receiving the projections, the frames can be easily positioned and mounting work for the cover plates can be simplified. When on the other hand the frames 219 and 220 are tapered at outer end edges and the front surface 212 of the casing 211 is made to have recesses for receiving the tapered edges of the frames, they can be engaged together without the permanent magnets.

With the employment of such protective cover as in the above, the protective cover may be easily exchanged with new cover in an event where spatters of welding material are caused to deposit on the protective covers 217 and 218, simply by disengaging the fitting frames 219 and 220, so that the arrangement should be particularly advantageous when the sensor has to be installed at a site of a narrow space. With the use of the optical plastic made cover, instead of conventional glass, it has been found that deposition rate of the spatters onto the protective covers 217 and 218 has been lowered to a remarkable extent.

What we claim as our invention is:

1. An optically scanning displacement sensor by means of a triangulation, the sensor comprising a light projecting means for radiating a light beam, a deviating means for deviating said light beam from said light projecting means towards an object to be detected and scanning said object, a light receiving optical means for condensing reflected light of said beam from said object and allowing said condensed reflected light to pass through said optical means, a position detecting means generating a pair of output position signals of values opposite to each other in response to a position on said position detecting means of a spot of said condensed light from said optical means, an operational means for operating on the basis of said pair of output position signals a distance of said object to generate a measured distance signal by adding and subtracting the pair of output position signals to operate a ratio between the position signals, and a linearity correcting means with respect to said measured distance, which correcting means obtaining a first distance signal proportional to said output position signals from said position detecting means to compute an inverse function and multiplying said first distance signal by a signal of a sum of said inverse function and a constant to compute a second distance signal proportional to a displacement of said distance of said object.

2. A sensor according to claim 1 wherein a first correction value to be added to said first distance signal, a second correction value to be added to said inverse function and a third correction value to be added to said constant are set for every scanning angle of said deviating means.

3. An optically scanning displacement sensor by means of a triangulation, the sensor comprising a light projecting means for radiating a light beam, a deviating means for deviating said light beam from said light projecting means towards an object to be detected and scanning said object, a light receiving optical means for condensing reflected light of said beam from said object and allowing said condensed reflected light to pass through said optical means, a position detecting means generating a pair of output position signals of values opposite to each other in response to a position on said position detecting means of a spot of said condensed light from said optical means, an operational means for operating on the basis of said pair of output position signals a distance of said object to generate a measured distance signal by adding and subtracting the pair of output position signals to operate a ratio between the position signals, and a linearity correcting means for correcting any non-linearity of said measured distance signal, wherein said light receiving optical means comprises an anamorphic optical means set to retain a swinging width of said condensed light spot on light receiving surface of said position detecting means following said scanning by said light beam over said object to be detected substantially to be within a width of said position detecting means.

4. A sensor according to claim 3 wherein said anamorphic optical means comprises a system of a convex lens, a cylindrical concave lens and a cylindrical convex lens.

5. A sensor according to claim 1 wherein said sensor is provided for use in a welding of working members which forming said object, and said operational means carries out an operation of determining a value of stepped part in said working members, said welding being made with respect to said stepped part, and computing a gap value between the working members by subtracting a thickness value of the respective members from said stepped part value.

6. A sensor according to claim 1 wherein said linearity correcting means comprises a high speed operational processor.

7. An optically scanning displacement sensor by means of a triangulation, the sensor comprising a casing having light projecting and receiving apertures, means provided in said casing for projecting a light beam, means provided in said casing for deviating said light beam from said light projecting aperture towards an object to be detected, a light receiving optical means disposed inside said light receiving aperture of said casing for condensing reflected light from said object, a position detecting means disposed to receive said condensed light for generating a pair of output signals of values opposite to each other in response to a position on said position detecting means of a spot of said condensed light from said optical means, an operational means for operating on the basis of said pair of output position signals a distance of said object to generate a measured distance signal by adding and subtracting the pair of output position signals to operate a ratio between the position signals, a linearity correcting means for correcting non-linearity of said measured distance signal, a protective cover of an optical plastic material and provided to each of said light projecting and receiving apertures of said casing, and a frame member for dismountably securing each of said protective covers to front face at each of said apertures of the casing.

8. A sensor according to claim 7 wherein said casing is further provided with permanent magnets disposed adjacent said light projecting and receiving apertures, and said frame members are formed by a ferromagnetic material to be magnetically coupled to said permanent magnets, for said dismountable securing of said protective covers.

* * * * *